United States Patent
Barber

[11] 3,885,503
[45] Apr. 24, 1974

[54] AMUSEMENT RIDE
[76] Inventor: Gerald L. Barber, 309 Cardinal Dr., Taylors, S.C. 29687
[22] Filed: Apr. 24, 1974
[21] Appl. No.: 463,445

[52] U.S. Cl. .................. 104/76; 104/53; 104/129; 104/172 S; 272/6; 272/29; 272/38
[51] Int. Cl. ............................................... A63g 1/08
[58] Field of Search ............. 104/53, 66, 69, 74, 75, 104/76, 127, 128, 129, 172 R, 172 S; 272/6, 272/7, 29, 38

[56] References Cited
UNITED STATES PATENTS

| | | | |
|---|---|---|---|
| 777,497 | 12/1904 | Cooper | 104/53 X |
| 839,024 | 12/1906 | Nelson | 104/129 |
| 3,596,905 | 8/1971 | Brown | 104/76 X |
| 3,610,614 | 10/1971 | Nishizawa | 104/127 X |

Primary Examiner—M. Henson Wood, Jr.
Assistant Examiner—Randolph A. Reese
Attorney, Agent, or Firm—Melvin A. Crosby

[57] ABSTRACT

An amusement ride in which a passenger carrier or cab is conveyed by a chain or the like to the top of a substantially vertical tower and is there released from the chain so that the cab drops in substantially free-fall to a region along the tower where it is braked to a halt or to a reduced speed. The cab near the end of the aforementioned braking zone is again engaged by a chain and is moved downwardly to the bottom of the tower and then again released for movement horizontally to near a loading position. After the cab is again loaded, it is moved into engagement with the first mentioned conveying chain and is carried thereby to the top of the tower for another free-fall cycle.

The entire structure is mounted on a trailer vehicle and the tower is so constructed that it can be collapsed on the vehicle for transporting.

17 Claims, 8 Drawing Figures

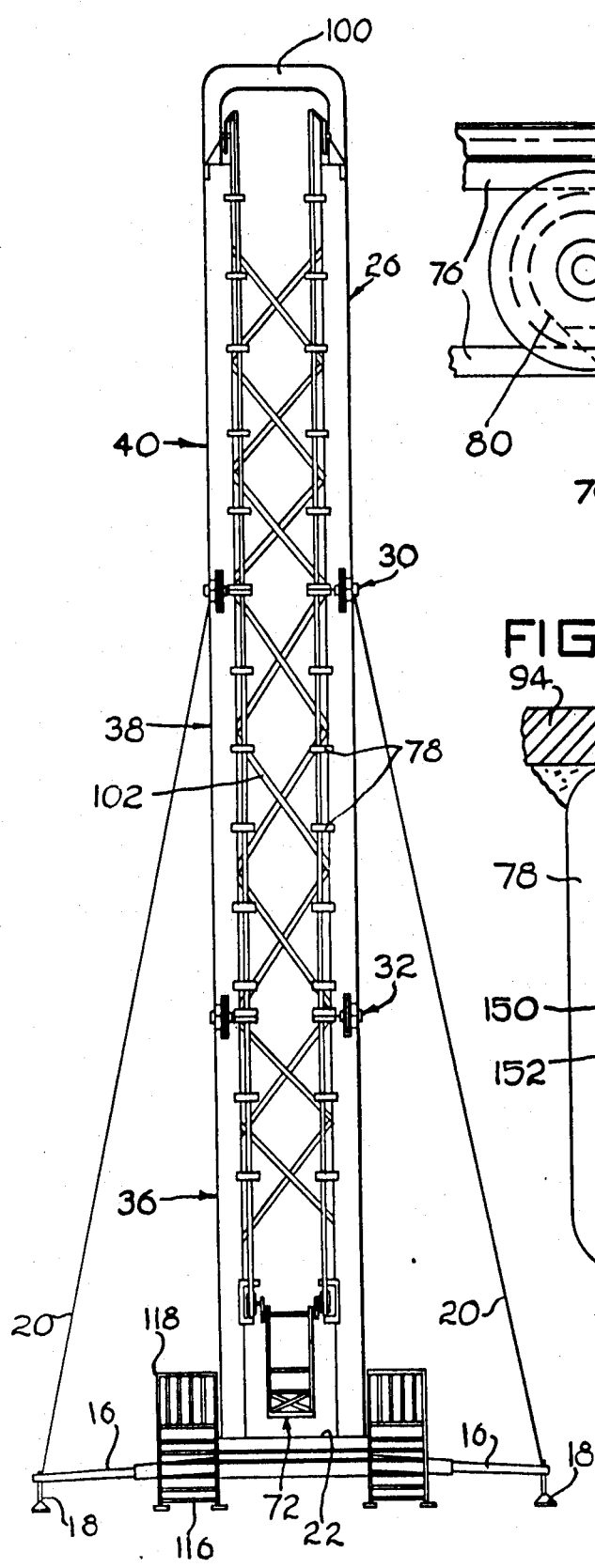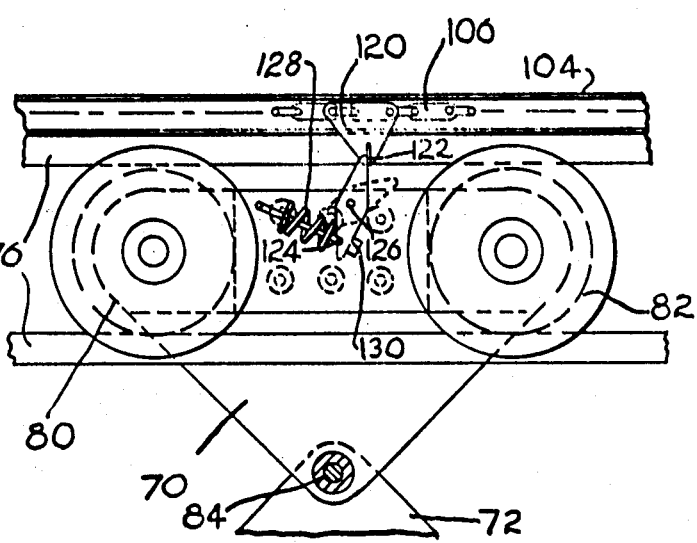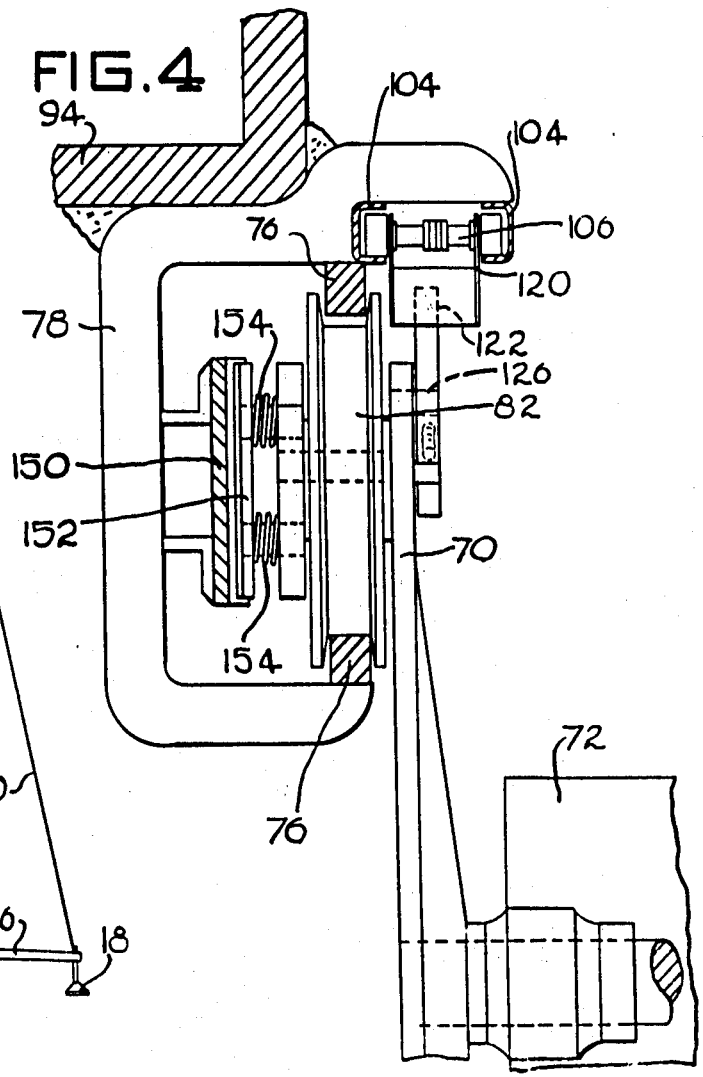

AMUSEMENT RIDE

The present invention relates to an amusement ride device and is particularly concerned with an amusement ride having a passenger cab which is conveyed to the top of a substantially vertical tower and permitted to drop in free-fall for a certain distance therefrom.

Amusement rides of many different types are known and quite a number depend for popularity upon rapid acceleration which quite often involves moving a passenger cab through curves and the like.

The present invention is concerned with a novel amusement ride in which a passenger compartment, or cab, is conveyed to a certain heighth and is then permitted to drop in substantially free-fall for a substantial distance. The cab is guided throughout its travel in the device and remains under control except in respect of the vertical movement during the free-fall period.

An object of the invention is the provision of a novel amusement ride of the nature referred to above.

Another object of the present invention is the provision of an amusement ride which is mounted on a trailer vehicle and which can be collapsed directly on the vehicle for transporting.

A still further object of the present invention is the provision of an amusement ride which involves a vertically elongated tower with the tower being so constructed and arranged that it can be collapsed to a relatively small height, thereby to permit the device to be transported from place to place.

BRIEF SUMMARY OF THE INVENTION

According to the present invention, an endless track arrangement is provided arranged somewhat in the form of an L with a shorter substantially horizontal lower portion and an elongated substantially vertical portion.

At least one cab, or passenger compartment, is provided which is guided on the track and associated with the track is a conveying chain which will attach to the cab when the cab is along the lower horizontal portion of the track and convey the cab upwardly to the top of the vertical portion of the track.

At the vertical portion of the track, the cab is released from the chain and is dropped in substantially free-fall vertically along the track to a lower region along the vertical portion of the track where it encounters braking means that will brake the cab either to a halt or to a greatly reduced speed.

The braked cab is then engaged by a conveyor chain, which may be a different chain from the first mentioned one, and is conveyed downwardly along the vertical portion of the track through the braking zone and then moves along the horizontal portion to an unloading and loading zone, and in which zone the cab is again braked and comes to a halt.

When the cab is again loaded, it can be moved either manually or by power means into engagement with the first mentioned conveyor chain and is then again conveyed upwardly to the top of the tower to be released for another free-fall cycle.

The tower is constructed on a trailer vehicle for movement from place to place and is jointed so that it can be collapsed into a plurality of substantially horizontally extending sections on the trailer vehicle. In collapsed condition the overall height of the entire device is such that the trailer vehicle can be connected to a tractor and then moved from place to place without encountering any problems of vertical clearance of the collapsed tower structure.

The objectives referred to above as well as still other objects and advantages of the present invention, and the particular manner in which the apparatus of the present invention is constructed will become more apparent upon reference to the following detailed specification taken in connection with the accompanying drawings in which:

FIG. 2 is a front view looking in at the amusement ride of the present invention from the right side of FIG. 1.

FIG. 3 is a fragmentary view showing a portion of the main conveyor chain and the manner in which it engages a carriage from which a passenger compartment is suspended.

FIG. 4 is a sectional view indicated by lines IV—IV on FIGS. 1 and 2 and drawn at somewhat increased scale.

DETAILED DESCRIPTION OF THE INVENTION

Figure 1:
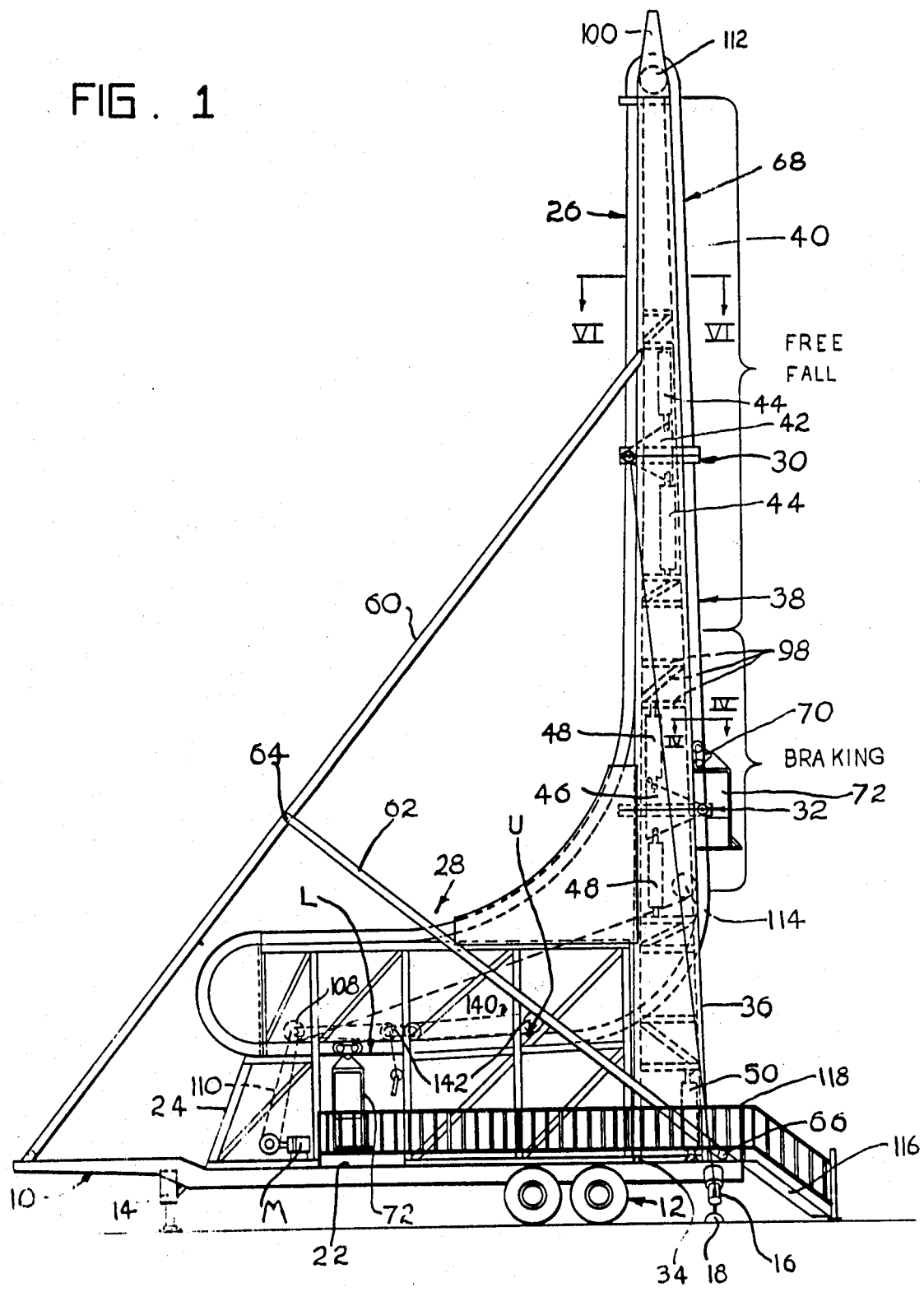
FIG. 1 is a side elevational view of the tower in erected condition.

Referring to the drawings somewhat more in detail, in FIGS. 1 and 2, it will be seen that the amusement ride according to the present invention comprises a trailer vehicle, generally designated by reference numeral 10, and having a rearwardly disposed wheeled truck 12 with retractable support posts 14 near the front of the trailer vehicle.

Disposed along the trailer vehicle at a suitable point are lateral booms 16, the outer ends of which are provided with ground engaging pads 18. The tower structure is connected to the outer ends of the booms 16 as by cables 20, thereby stabilizing the tower against tilting due to wind forces and the like. The booms 16 are either demountable or collapsible so that they do not extend outwardly beyond the trailer vehicle when the ride is collapsed for transport.

Mounted on the bed 22 of trailer vehicle 10 is a support structure, generally indicated at 24, and which is in the form of a tower having a main elongated vertical portion, generally indicated at 26, and a smaller horizontal portion, generally indicated at 28, and extending laterally at the bottom of the vertical portion 26. The tower, as will be seen in FIG. 2, has two side parts arranged in spaced parallel relation.

The tower has a first pivot joint therein at 30, a second pivot joint therein at 32, and the bottom of the vertical portion 28 of the tower is pivotally connected a 34 to the bed of the trailer vehicle. The arrangement i such that the lowermost section 36 of the vertical por tion 26 of the tower can be pivoted forwardly of th trailer bed about pivotal support 34, while the interme diate section 28 of the tower can pivot toward the rea about pivot 32, while the uppermost section 40 can pivot forwardly about pivot 30, whereby the vertical portion 26 of the tower can be collapsed to a substantially reduced height for transport.

That portion of the support structure 24 disposed forwardly on the trailer bed from the vertical portion 26 of the tower can be detachable or adjustable to provide space for the collapsing of sections 36, 38 and 40 of vertical portion 26 of the tower down on the trailer bed.

At pivot 30 a triangular plate 42 is provided pivoted on pivot 30 at one corner and fluid operable cylinders 44 are connected between the other corners of the plate and the respective sections 38 and 40 of the vertical portion 26 of the tower so that, by actuation of the cylinders, the portions 38 and 40 can be erected into the position shown in FIG. 1 or can be collapsed so as to be substantially flat against one another.

Similarly, a triangular plate 46 is provided having one corner pivoted to pivot 32 and having fluid motors 48 connected between the other corners and points on the adjacent sections 36 and 38 so that these sections also can be actuated by the fluid motors into erected position or collapsed position.

Finally, a still further fluid motor 50 is connected between lowermost section 36 and the bed of the trailer vehicle so that this section can be collapsed forwardly against the trailer bed or erected to the position illustrated in FIG. 1.

When the tower is erected, a jointed brace member 60 is provided connected between an upper region of vertical portion 26 of the tower and the forward portion of the trailer vehicle with a further brace member 62 having one end connected to the joint 64 of member 60 and the rear end pivotally connected at 66 to the rearward end of the trailer vehicle. This bracing arrangement insures that the tower will be firmly supported when in erected position while the brace member 60 and 62 can be disconnected from the tower and from each other and folded down flat on the trailer bed for transport.

The erected structure comprises an endless track generally designated at 68 and along which a vehicle carriage 70 is adapted to move with a passenger compartment 72 pivotally suspended from carriage 70 so as always to maintain an upright position.

The track referred to is made up of metal bars, rectangular, for example, arranged in spaced parallel relation, the said bars being designated 76 in FIG. 4. One set of the bars are provided on each lateral side of the tower structure. Bars 76 are fixedly secured to C-shaped support members 78 which are distributed along the length of the tower structure and fixed thereto as by welding. The bars 76 are in uniformly spaced parallel relation and are adapted to engage rollers 80 and 82 provided on carriage 70 and while holding the rollers captive in the track. This will be clearly seen in FIGS. 3 and 4 with FIG. 3 also showing the pivot 84 by means of which the carriage 70 swingably supports compartment or cab 72.

The C-shaped support members 78 referred to above are so distributed on the tower structure that a pair thereof are disposed on each side of vertical portion 26 of the track at each of the joints 30 and 32 therein.

Figure 7:
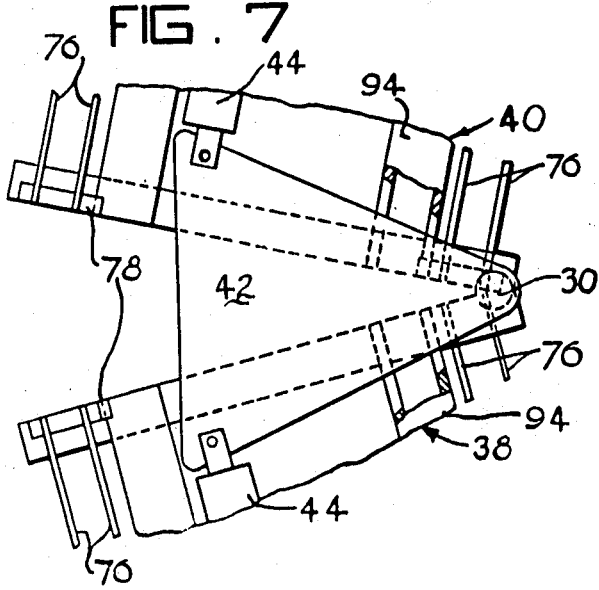
FIG. 7 is a fragmentary view indicated by line VII—VII on FIG. 6, and showing a joint arrangement provided in the tower to permit collapse thereof.
Figure 8:
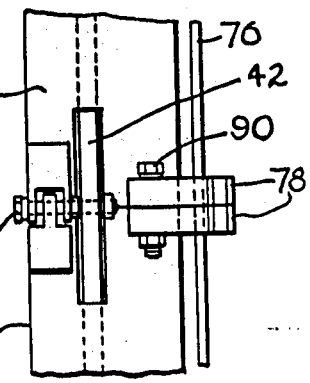
FIG. 8 is a view looking in from the side of FIG. 6 as indicated by line VIII—VIII on FIG. 6 and showing the manner in which the joint in the tower is secured when the tower is erected.

As will be seen in FIGS. 7 and 8, the C-shaped members thus provide abutment to stop the sections of the tower in erected position and also provide means for holding the sections fixedly together. For example, as will be seen in FIGS. 7 and 8, bolts 90 can be provided which extend through apertures 92 provided in adjacent ones of the C-shaped members 78 so that when the tower is erected it is firmly clamped together. FIGS. 7 and 8 also show the arrangement of pivot 30 which pivotally interconnects the adjacent sections 38 and 40 of the vertical portion 26 of the tower, while also providing pivotal support in the corner of triangular plate 42.

Figure 6:
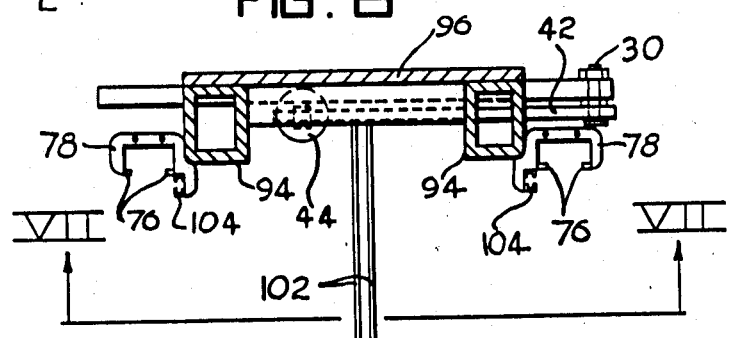
FIG. 6 is a plan sectional view indicated by line VI—VI on FIG. 1, and drawn at increased scale.

The various sections of the tower may be constructed of tubular members 94, as shown in FIG. 6, with plates 96 connected therebetween at the sides so as to leave the tower open adjacent the tracks. Lateral and inclined reinforcing elements, as indicated by the dotted lines 98 in FIG. 1, can be provided for bracing the two lateral sides of the tower structure relative to each other.

Since the tower, as seen in FIG. 2, comprises two side members which are substantially independent at the very top of vertical portion 26 of the tower, there is an inverted U-shaped yoke member 100 connected between the two sides of the tower in order to fix them together. In the intermediate region of the tower as, for example, in section 38 thereof, there may additionally be provided the X bracing 102 which, as will be seen in FIG. 6, is disposed about midway in the vertical portion of the tower in the fore and aft directions.

The C-shaped supports 78 also support the opposed U-shaped channel elements 104 which, when the tower is erected, are substantially continuous around the tower and provide a guideway for a conveyor chain 106. This conveyor chain, as will be seen in FIG. 1, is engaged by a drive sprocket 108 near the forward end of horizontal portion 28 of the tower and which sprocket is connected for being driven by a drive motor via a belt or chain 110. The conveyor chain 106 is guided by sprocket 108 around the end of the left end of the horizontal portion 28 of the tower and then upwardly along the forward side of the vertical portion of the tower and is entrained about a sprocket 112 at the top of the tower. At this point, it will be understood that the conveyor chain is, in fact, a pair of chains with one pertaining to each side section of the tower.

The conveyor chain leaving sprocket 112 is guided down the rearwardly facing side of the tower and then separates from the path of the passenger cab by passing about a sprocket 114 from which the chain then moves downwardly on an incline toward the first mentioned drive sprocket 108.

A passenger cab 72 will be loaded while on the lower horizontal portion 28 of the tower structure. The cab is shown in FIG. 1 in loading position. The passengers enter and leave the trailer bed by stairway means 116 and are confined on the trailer bed as by the fence means 118. In the loading region, where the cab 72 is illustrated in the bottom of FIG. 1, there is no driving chain and when the cab, or compartment, is loaded it is manually moved by the operator outwardly toward drive sprocket 108 and into engagement with the chain means 106 and which, as mentioned, consists of a respective chain on each side of the tower.

When the cab or passenger compartment is moved within the region of sprocket 108 so as to be engaged by the chain means, the engagement is effected as will be seen in FIG. 3. The chain means 106 in FIG. 3 has brackets 120 thereon and each bracket has a laterally extending plate 122. Each carriage 70, or each passenger compartment, has a lever element 124 connected thereto as by a pivot 126 and each lever element is spring biased as by a spring 128 toward the position which the lever is illustrated in FIG. 3.

In this position the lever element abuts a stop lug 130 on the carriage and the uppermost end of the element lies in the path of the plates 122 so that movement of the chain in the leftward direction, as it is viewed in FIG. 3, will bring about positive engagement of the chain with the carriage of the compartment and the compartment will thereby be driven by the chain around the arcuate left end of the horizontal lower portion 28 and then up to the top of vertical portion 26 of the tower.

When the carriage passes around the upper end of the track to the top of that portion of the tower which is marked "FREE FALL," the carriage will be biased by gravity in such a direction that the carriage will run ahead of the chain and will drop down the range of free fall substantially freely of the action of gravity. During free fall, lever element 124 will ratchet over any plates 122 in the path thereof.

At the bottom of the free fall range is a second range marked "Braking" and within this range the passenger cab or compartment is braked substantially to a halt, or to such reduced speed that it will again be overtaken by the chain means 106 and driven on downwardly to the lower end of the braking zone which is located at about the level of sprocket 114. At this point the cab is released and moves by gravity down the remainder of vertical portion of the tower and around the curve at the lower end thereof and toward the loading zone.

A second braking arrangement is provided for slowing down the compartment or cab, after it rounds the curve at the bottom. This braking zone will bring the cab, or compartment, to a halt at about the point marked U in FIG. 1, and at which point the cab, or compartment, is within the range of a selectively operable second drive chain 140. Point U may form the beginning of the unloading zone.

Drive chain 140 can engage the carriage of the cab, or compartment, in the manner as the first mentioned drive chain but the second mentioned drive chain is selectively operable and under the control of the operator. The drive chain 140 may be entrained over sprockets 142 and at least one of which is selectively drivable, as by electric motor, under the control of the operator.

Thus, after the compartment, or cab, comes to a halt near the right end of chain 140, it can then be moved into the loading zone marked L at the will of the operator. Within loading zone L, as mentioned previously, the cab is disconnected from all chains and will remain stationary until pushed toward sprocket 108 and the main drive chain by the operator.

Figure 5:
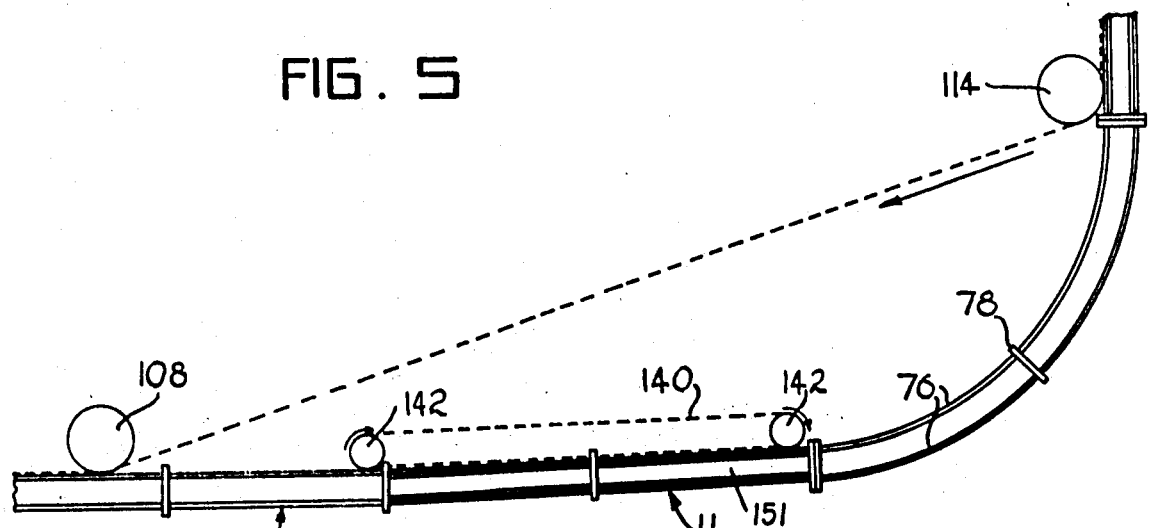
FIG. 5 is a schematic view looking in at the side of the lower portion of the endless track at the loading zone.

The aforementioned region of the apparatus, showing unloading zone U, loading zone L, and chain 140 is shown in FIG. 5, which also shows the location of the brake pads 151 in that region.

With reference to the brakes provided within the main braking zone, along the vertical portion of the tower and in the zone where the cab, or compartment, stops in operative association with chain 140, each of the brakes may consist of elongated brake pad means 150 carried by the tower on each side as, for example, by being secured to the C-shaped supports 78 and which brake pads taper inwardly in the direction of movement of the cab, or compartment, around the track.

Cooperating with brake pads 150 are friction pads 152 carried on the sides of the carriage on the cab and spring urged by springs 154 in the outward direction. By selecting the springs 154 and the material of the friction pads and the brake pads, and the inclination of the pads 150 any desired degree of braking effect can be exerted on the passenger cab, or compartment, as they move through the braking zone.

It will be evident that the collapsing of the ride according to the present invention can be accomplished relatively simply by disconnecting the sections of the tower from each other adjacent pivots 30 and 32 and collapsing these sections by utilizing the fluid motors 44, 48 and 50. The parts of the structure disposed forwardly on the trailer bed from the vertical tower can either be moved laterally or disconnected from the trailer bed in order to provide space for the tower to fold downwardly.

The chain guideway in the form of channels 104 is, of course, separable at each point that the tower separates during collapsing and the chain means 106 running in the chain guideway is preferably disconnected in different regions there-along so it does not interfere in any way with the collapse of the tower. The cabs, or passenger compartments, can readily be stored on the trailer deck and all of the supports and braces such as elements 60 and 62 and the booms 16 and the like can be knocked down and loaded on the trailer bed. The erection of the structure is relatively simple and can be accomplished quickly and the collapsing thereof can be accomplished relatively quickly.

What is claimed is:

1. In an amusement ride; endless track means in the form of a loop comprising a vertical portion and a horizontal portion extending laterally from the bottom of the vertical portion, a carriage having a passenger compartment suspended therefrom and captive on the track means for movement in one direction therearound, first conveyor means operable to engage the carriage in a first predetermined position on said horizontal position and to move the carriage to the top of said vertical portion and to release the carriage thereat for free fall along the vertical portion, cooperating brake elements on said carriage and on said vertical portion near the bottom thereof forming first brake means for braking said carriage, second conveyor means operable to engage and move the carriage out the bottom of the first brake means for movement to a second predetermined position on said horizontal portion, second brake means for arresting the carriage in said second predetermined position, and selectively operable means for moving said carriage from said second predetermined position toward said first predetermined position, all movements of said carriage being in said one direction around said endless track means.

2. An amusement ride according to claim 1 in which each of said vertical and horizontal portions of said track means comprises coplanar spaced parallel straight sections and curved sections interconnecting said straight sections.

3. An amusement ride according to claim 1 in which said track means comprise laterally spaced endless tracks in respective vertical planes which are parallel 4. An amusement ride according to claim 1 in which said first conveyor means comprises chain means guided along said track means, and cooperating elements of one-way drive means on said chain means and on said carriage.

5. An amusement ride according to claim 4 in which said one-way drive means comprises a plate on one of said carriage and first conveyor chain means and a pawl pivotally mounted on the other thereof, said plate and pawl engaging to cause said conveyor chain means to move said carriage in said one direction while permitting said carriage to over run said conveyor chain means in said one direction.

6. An amusement ride according to claim 1 in which said first conveyor means comprises chain means guided along said track means, and cooperating elements of one-way drive means on said chain means and on said carriage, said first and second conveyor means comprising one and the same chain means.

7. An amusement ride according to claim 6 in which said selectively operable means comprises further conveyor chain means engageable with a carriage in said second predetermined position and selectively operable to move the carriage toward said first predetermined position.

8. An amusement ride according to claim 7 in which said further conveyor chain means releases said carriage prior to the carriage reaching said first predetermined position, said carriage thereafter being manually moveable into said first predetermined position.

9. An amusement ride according to claim 8 in which said first conveyor chain means extends from near said first predetermined position on said horizontal portion of said track means along said track means in said one direction to the exit end of the said brake means along the vertical portion of said track means, a first motor for driving said first chain means continuously in said one direction, said second conveyor chain means comprising endless chain means extending from near said second predetermined position to near said first predeterminted position, and a second motor for driving said second conveyor chain means and adapted for selective energization.

10. An amusement ride according to claim 1 which includes a framework supporting said endless track means.

11. An amusement ride according to claim 10 in which said track means comprises a pair of tracks in spaced parallel vertical planes, each track comprising a pair of bars in uniformly spaced parallel relation in the plane of the respective track, said carriage having a pair of grooved rollers at each side engaging the bars of said tracks.

12. An amusement ride according to claim 11 which includes support elements distributed along said framework and connected to said tracks to support the tracks on the framework.

13. An amusement ride according to claim 11 in which said conveyor means includes a chain adjacent each track, and chain guiding channels connected to said support elements and guiding said chains.

14. An amusement ride according to claim 1 which includes a framework supporting said endless track means, said framework including a tower supporting said vertical portion of said track means, said tower being jointed to permit collapsing thereof for transporting of the ride.

15. An amusement ride according to claim 1 which includes a trailer type vehicle having a bed, framework on said trailer bed supporting said track means and including a tower supporting said vertical portion of the track means, said tower being pivotally connected to said vehicle bed and being jointed between the top and bottom whereby said tower can be collapsed on said trailer bed for transport.

16. An amusement ride according to claim 15 in which said framework is more narrow than said trailer bed, and rail means along opposite side edges of said bed defining passenger walkways along each side of said framework.

17. An amusement ride according to claim 1 in which said brake means include brake shoes on opposite sides of the carriage and elongated brake strips adjacent the track means on each side of the carriage engageable with the brake shoes, said shoes and strips being spring biased toward each other, at least said strips converging in said one direction.

* * * * *